Figure 1:
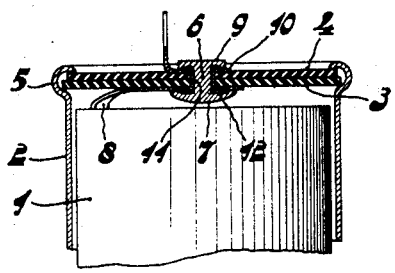

Aug. 12, 1958  R. D. BÜGEL  2,847,622
ELECTROLYTIC CAPACITOR
Filed July 9, 1953

INVENTOR
ROELOF DIRK BÜGEL
BY
AGENT

United States Patent Office 2,847,622
Patented Aug. 12, 1958

2,847,622

ELECTROLYTIC CAPACITOR

Roelof Dirk Bügel, Eindhoven, Netherlands, assignor, by mesne assignments, to North American Philips Company, Inc., New York, N. Y., a corporation of Delaware Application July 9, 1953, Serial No. 367,002

Claims priority, application Netherlands July 10, 1952

4 Claims. (Cl. 317—230)

The present invention relates to an electrolytic capacitor. More particularly, the invention relates to an electrolytic capacitor comprising an anode connection shaped in the form of a rivet taken through an insulating wall portion, a supply strip connected to the anode being clamped between the rivet and the insulating wall portion on the inner side of the latter, the connecting strip and the rivet being made of a film-forming metal.

It has been found that, after a time, the electrical contact between the supply strip and the rivet of such a capacitor may be interrupted without distinct mechanical causes. It is assumed that this interruption is due to the formation of an insulating layer at the contact areas under the action of the electrolyte penetrating into the capillary gap remaining between the two parts. This may be avoided by welding together the supply strip and the rivet prior to the mounting of the capacitor. This entails the disadvantages of an additional manipulation, a more difficult mounting and the great risk of the rivet breaking off the supply strip during the treatment of the winding prior to its introduction into the housing.

The invention has for its object to provide a different construction, by which the said disadvantages are avoided and which does not render the manufacture of the capacitor appreciably more complicated or more costly.

According to the invention provision is made of a layer of a non-film-forming metal under the rivet and completely covered thereby, said layer being in electrical contact with the supply strip and the rivet. It is assumed that the reason for interruption of the anode connection no longer occurring may be as follows: With respect to the anode, and hence also with respect to the supply strip and the rivet, the electrolyte penetrating after a time into the capillary gap between the supply strip and the rivet is at negative potential so that current flows from the electrolyte to the supply strip and the rivet. Thus a blocking layer is formed on these two parts. By providing a layer of a non-film-forming metal between the rivet and the supply strip, the electrolyte will discharge across said layer as soon as it has penetrated into the gap between the supply strip and the rivet so far as to reach the said layer. Due to the nature of the material of said layer, no blocking layer is then produced, so that interruption of the electrical contact does not occur. If the rivet completely covers the additional layer, the quantity of electrolyte which may come into contact with said layer is small, so that the current passing from the electrolyte to the said layer, said current being a leak current of the capacitor, is kept very low.

The layer of non-film-forming material is preferably constituted by a separate intermediate piece slipped on the rivet, for example, a metal washer or a sleeve having a flange engaging the supply strip. The intermediate piece may, moreover, be coated by a superficial layer of a suitable metal, for example, tin or silver.

Figure 2:
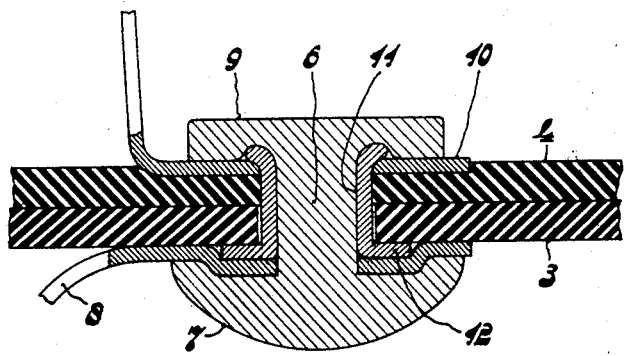

In order that the invention may be readily carried into effect, it will now be described with reference to the accompanying drawing, in which:

Fig. 1 is a sectional view of part of one embodiment of an electrolytic capacitor according to the invention; and Fig. 2 is a detail of a portion of Fig. 1 on a greatly enlarged scale.

The wound part 1 of the electrolytic capacitor shown is housed in a cylindrical metal housing 2, which is closed at the top by a closing plate comprising an insulating disc 3 and a rubber coating 4. The edge of the disc 3 bears on an internal shoulder 5 of the housing 2 and is pressed tightly thereon, since the edge of the housing is flanged and bears on the edge of the rubber disc 4.

An aluminum rivet 6 is positioned in a central aperture of the discs 3 and 4. Under the head 7 of the rivet adjacent the wound part 1 provision is made of the end of an aluminum supply strip 8, which is connected to an anode in the wound part 1. The supply strip 8 is fixed between the head 7 of the rivet and the lower side of the insulating disc 3. At the side of the rubber disc 4, i. e. outside the capacitor housing, a soldering tag 10 is provided between the part 9, flattened after introduction of the rivet, and the rubber disc 4. Under the head 7 of the rivet and the supply strip 8 provision is made of a layer of a non-film-forming material. In the embodiment shown the non-film-forming layer is formed by a tin-plated copper sleeve 11, having a flange 12, the diameter of the latter being smaller than the diameter of the head 7. Due to the difference in diameter, the material of the head 7 flows beyond the edge of the flange 12 during the riveting operation, so that the flange is completely covered by the rivet.

In the embodiment described above the layer of non-film-forming material is constituted by a flanged sleeve slipped on the rivet. Instead of using a sleeve, use may, as an alternative, be made of a metal ring, which is provided between the head of the rivet and the supply strip.

While the invention has been described by means of a specific example and in a specific embodiment, I do not wish to be limited thereto for obvious modifications will occur to those skilled in the art without departing from the spirit and scope of the invention.

What is claimed is:

1. An electrolytic capacitor comprising an enclosure having an apertured insulating wall portion, and an anode connection mounted in the aperture of said wall portion for effecting external circuit connection to the inside of said enclosure, said connection comprising a rivet member constituted of film-forming metal extending through the aperture of said insulating wall portion and riveted to said wall portion, and having a head within said enclosure, a supply strip constituted of film-forming metal disposed within said enclosure and clamped between the rivet head and the inner surface of the insulating wall portion, and a layer of non-film-forming metal disposed under the rivet and in electrical contact with the rivet and the supply strip, the head of said rivet completely covering said layer, and an external connecting member clamped between another part of said rivet and the outer surface of said insulating wall portion.

2. An electrolytic capacitor comprising an enclosure having an apertured insulating wall portion, and an anode connection mounted in the aperture of said wall portion for effecting external circuit connection to the inside of said enclosure, said connection comprising a rivet member constituted of film-forming metal extending through the aperture of said insulating wall portion and riveted to said wall portion and having a head within said enclosure, a supply strip constituted of film-forming metal disposed within said enclosure and clamped between the rivet head and the inner surface of the insulating wall portion, an annular member having a surface of non-film-forming metal disposed under and surrounding the rivet and in electrical contact with the rivet and the supply strip, the head of said rivet completely covering said member, and an external connecting member clamped between another part of said rivet and the outer surface of said insulating wall portion.

3. An electrolytic capacitor as claimed in claim 2 wherein the annular member comprises a flanged sleeve with the flanged portion disposed under the head of the rivet.

4. An electrolytic capacitor as claimed in claim 2 wherein the annular member has a metal coating selected from the group consisting of tin and silver.

References Cited in the file of this patent

UNITED STATES PATENTS

| | | |
|---|---|---|
| 2,017,204 | Fisher | Oct. 15, 1935 |
| 2,061,981 | Rhodes | Nov. 24, 1936 |
| 2,246,933 | Deeley | June 24, 1941 |
| 2,307,561 | Bailey | Jan. 5, 1943 |

FOREIGN PATENTS

| | | |
|---|---|---|
| 23,175 | Australia | June 21, 1935 |